United States Patent [19]

Schnez

[11] 4,123,484
[45] Oct. 31, 1978

[54] PROCESS FOR THE REMOVAL OF FISSION-PRODUCT INERT GASES IN THE REPROCESSING OF NUCLEAR FUEL MATERIAL

[75] Inventor: Harald Schnez, Waldsee, Germany

[73] Assignee: Kernforschungsanlage Jülich Gesellschaft mit beschränkter Haftung, Jülich, Germany

[21] Appl. No.: 731,990

[22] Filed: Oct. 13, 1976

[30] Foreign Application Priority Data

Jan. 27, 1976 [DE] Fed. Rep. of Germany ....... 2602897

[51] Int. Cl.² .............................................. G21C 21/00
[52] U.S. Cl. ............................... 264/0.5; 252/301.1 S
[58] Field of Search .................. 264/0.5; 252/301.1 R, 252/301.1 S

[56] References Cited

U.S. PATENT DOCUMENTS

| | | | |
|---|---|---|---|
| 3,677,958 | 7/1972 | Lonadier et al. | 264/0.5 X |
| 3,720,739 | 3/1973 | Hagie et al. | 264/0.5 X |
| 3,865,746 | 2/1975 | Rubin et al. | 264/0.5 X |
| 3,981,960 | 9/1976 | Brambilla et al. | 252/301.1 R |

Primary Examiner—Peter A. Nelson
Attorney, Agent, or Firm—Karl F. Ross

[57] ABSTRACT

A process for the removal of fission-product inert gases from the waste gases of a reprocessing plant for nuclear fuel materials in which the nuclear fuel is subjected to comminution and, after burning off of graphitic components, is subjected to chemical solubilization, e.g. in an acid. During the solubilization, a sparging gas is passed through the solution which entrains with it the waste gases from the solubilizer or digestion vessel. After acid recovery, the gas phase is filtered and collected, a portion of the gas phase, constituting the sparging gas, is recirculated to the solubilizing unit and consists predominantly of fission-product inert gas (generally xenon, krypton and krypton isotopes).

5 Claims, 2 Drawing Figures

PROCESS FOR THE REMOVAL OF FISSION-PRODUCT INERT GASES IN THE REPROCESSING OF NUCLEAR FUEL MATERIAL

FIELD OF THE INVENTION

The invention relates to a process for the removal of fission-product inert or noble gases from the waste gases of a reprocessing plant for nuclear fuels and, more particularly, to a system for recovering and removing such inert gases in the reprocessing of nuclear fuels.

BACKGROUND OF THE INVENTION

In the reprocessing of nuclear fuel materials, e.g. uranium oxide and thorium oxide fuel cores in pyrolytic graphite shells or sheaths, and like systems in which the nuclear fuel material is encapsulated or encased in a pyrolytic carbon sheath, fission-product inert gases are formed during insertion of the fuel elements into the reactor core in the so-called "head end" phase, the gases being trapped in the graphitic sheaths or the enclosures for the fuel elements. The fission-product inert gases are usually radioactive krypton-85, other krypton isotopes and xenon.

During the reprocessing stages, usually when the fuel element is solubilized in acid, a sparging gas stream is passed through the solubilizing unit and entrains the fission-product inert gases therewith.

The exhaust gases from the solubilizing unit thus contain radioactive components having a long half-life and which cannot be directly discharged into the atmosphere because of the environmental pollution hazard.

It is known to remove the radioactive components namely the fission-product inert gases, from such exhaust gases. In one published system (Whatley, M.E., "Calculations on the Performance of the KALC Process", ORNL-4859, 1973), the fission-product inert gases are washed out of the exhaust gas stream and absorbed by special solvents.

In another system for accomplishing a similar purpose, the fission-product inert gases are recovered by low temperature rectification of the exhaust gas stream (see BEAUJEAN H. et al, "Gaseous Radioactive Emissions from Reprocessing Plants and Their Possible Reduction", IAEA/SM-172/17, 1973).

It has also been proposed to use helium as a sparging gas in a closed chemical solubilizer and to recycle the helium thereto (see German Auslegeschrift DT-AS 24 26 764). The fission-product inert gases are removed from the helium before it is recycled by a sublimation or freezing process.

All of these prior art processes have the disadvantage that they are relatively costly and require complex and expensive apparatus and are not always technologically satisfactory. Furthermore, for the cleaning of the exhaust gas it is necessary usually to employ foreign media such as, for example, solvents like freons or sparging gases like helium.

OBJECTS OF THE INVENTION

It is the principal object of the present invention to provide an improved process for the removal of fission-product inert gases from the exhaust gases of a plant for the reprocessing of nuclear fuel materials whereby the disadvantages of the various systems are avoided and which can be carried out with technological simplicity and high economy.

It is another object of the invention, in a system of the character described, to provide a process which minimizes the exhaust gas quantity which must be handled and thus reduces the size of the processing apparatus, its cost and the like, the system operating with high separation efficiency.

SUMMARY OF THE INVENTION

These objects and others which will become apparent hereinafter are attained, in accordance with the present invention, in a process for the treatment of nuclear fuel materials which involves the comminution of the nuclear fuel elements, the combustion or burning of the graphitic components thereof and the chemical solubilization of the nuclear fuel residue in a solubilizing unit through which a sparging gas is passed. The sparging or flushing gas, according to the invention, is a part of the filtered fission-product gases recovered earlier and recycled to the solubilizer as the rinsing, sparging or entraining gas.

The fission-product inert gases released in the solubilizing unit can be cleaned in conventional ways and gathered in a compensating storage reservoir or expansion tank. From the latter the sparging gas is withdrawn as required for proper functioning of the chemical solubilizer so that a portion of the fission-product inert gases is recycled continuously. The fission-product gas quantity required for the recirculation to the chemical solubilizer may be supplied thereto via control means maintaining the supplied quantity per unit time substantially constant. The gas recovered from the chemical reactor is separated from the acid, compressed and supplied to a storage vessel from which the reactor is fed with the recycled gas and from which gas bottles may be filled for discharge of the inert gases from the system.

The advantages of the process according to the invention lie primarily in its simplicity and economy since the sparging gas cycle uses only the fission-product inert gases which are produced by solubilization of the nuclear fuel material. The system is readily controlled and explosive gas mixtures which may result from the formation of ozone or hydrocarbon/oxygen mixtures cannot arise. The formation of such explosive mixtures is known in conventional reprocessing plants.

Still another and highly important advantage of the system of the present invention is that with the recirculation of fission-product inert gases as the exclusive sparging gas stream, no corrosive gas is developed and the sparging gas undergoes no chemical reactions in the chemical solubilizer or reactor.

According to a feature of the invention before the filtered fission-product inert gas is recycled to the chemical reactor, krypton is removed. This can be effected most advantageously by compressing the fission-product inert gases, cooling them and subjecting them to rectification into a liquid phase consisting predominantly of xenon and a gas or vapor phase consisting predominantly of krypton mixtures. The vapor phase removed from the rectification column thus consists primarily of krypton mixtures at an elevated pressure and can be stored at this elevated pressure. The liquid phase, consisting predominantly of xenon, is at least partially recycled to the chemical solubilizer.

BRIEF DESCRIPTION OF THE DRAWING

The above and other objects, features and advantages of the present invention will become more readily apparent from the following description, reference being made to the accompanying drawing in which.

SPECIFIC DESCRIPTION AND EXAMPLES

Figure 1:
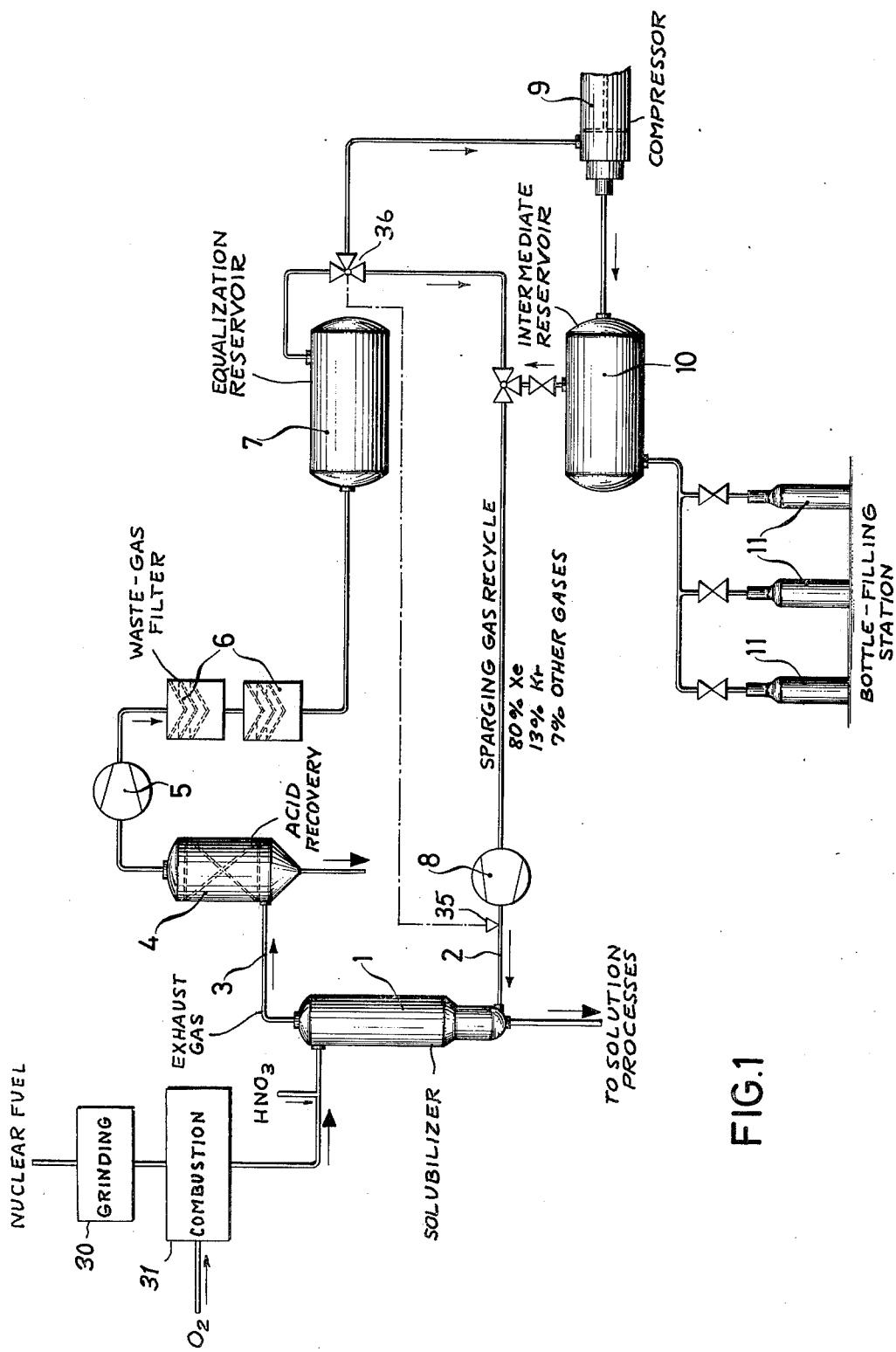
FIG. 1 is a flow diagram of one embodiment of the process according to the invention using the recycling of fission-product exhaust gases.

The system of the present invention comprises a chemical solubilizer 1 to which the nuclear fueling material, having been ground at 30 and subjected to combustion at 31 to eliminate graphitic or carbon components, is fed at 24 via a conveyor worm. Nitric acid or another digesting acid is introduced into the solubilizer or digester 1. In the digester 1, the nuclear fuel material is subjected to chemical treatment which solubilizes the fissionable substances and releases fission-product inert gases which are entrained from the digesting unit 1 via the gas line 3 as an exhaust gas with a sparging gas introduced via line 2. The exhaust or waste gas recovered at 3 is thus the sparging inert gas, the fission-product inert gas released in the digestion process and other gaseous or volatile components.

Exhaust gas is introduced into an acid recovery unit 4 in which the acid is removed by condensation and any residual nitrogen oxide is reoxidized to $HNO_3$.

The waste gas removed from the acid recovery column 4 is displaced by a gas pump 5 via a filter 6 into an equalizing reservoir 7 which compensates for variations in demand for the gas.

From the reservoir 7, the fission-product inert gas is drawn by a gas pump 8 and recycled through a line 2 to bubble through the digestion 1. A control element (not shown) in duct 2 can regulate the supply of the recycled fission-product inert gas to the digester 1 so that this recycled quantity per unit time remains constant (see FIG. 2). Surplus fission-product inert gas is compressed by the compressor 9 and is fed to an intermediate reservoir or tank 10 from which the gas bottles 11 can be filled or, as required from which additional sparging gas fed to duct 2.

Figure 2:
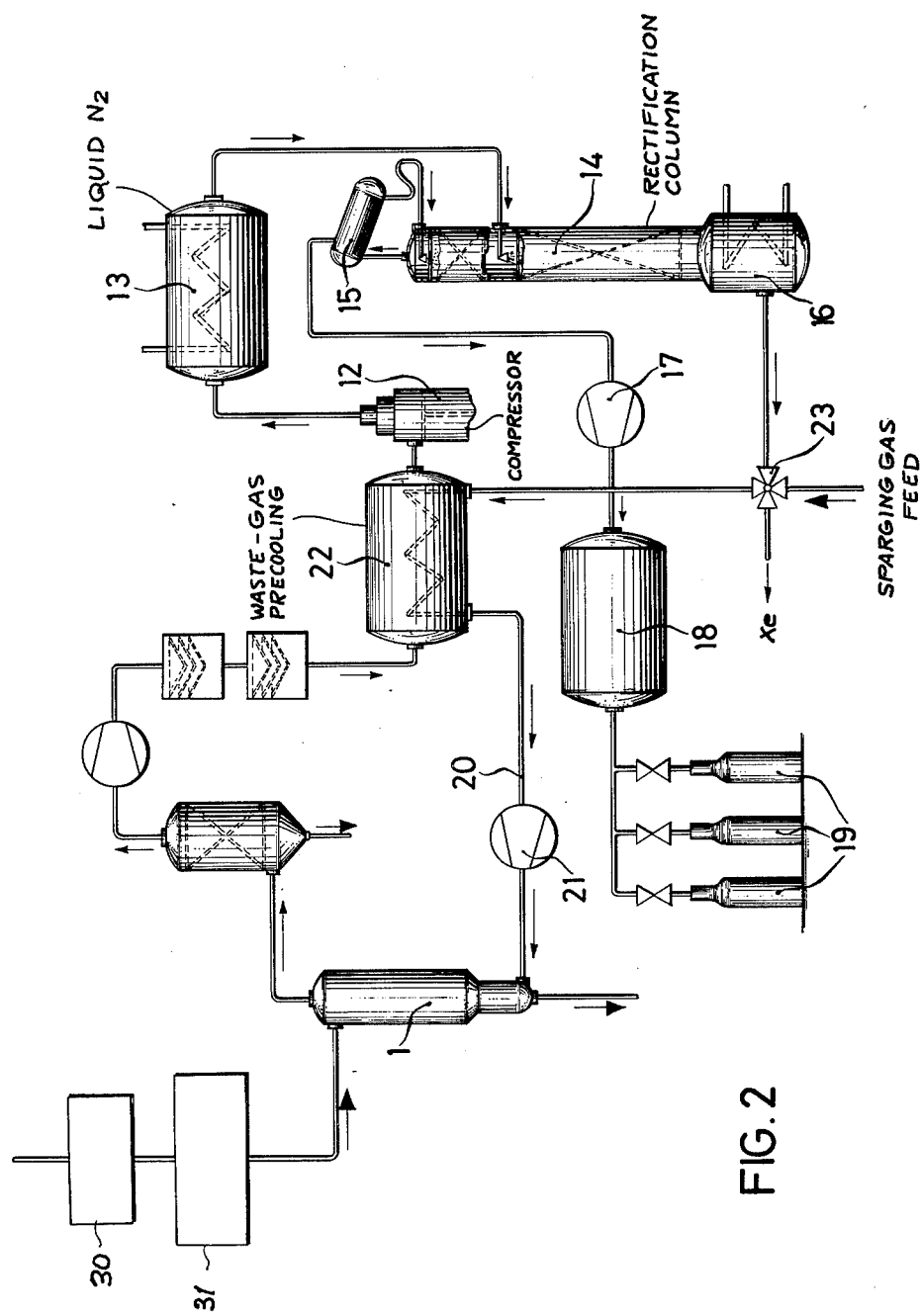
FIG. 2 is a flow diagram of a reprocessing system in which the recycled fission-product inert gas has previously been treated to remove or separate krypton therefrom.

In the embodiment illustrated in FIG. 2, before the fission-product inert gas is recycled to the digester 1, the waste gas is subjected to compression and after being filtered at 6, is precooled at 22 in heat exchanging relationship with xenon drawn from the sump of the rectification column. The cooled waste gas is compressed at 12 and deep cooled in a heat exchanger 13 in indirect heat-exchanging relationship with liquid nitrogen.

The partly liquified exhaust gas is then introduced into the rectification column 14 in which it is separated into a krypton mixture and a xenon mixture. The krypton component is recovered as a vapor phase at the head of the column and may be refluxed thereto. At least a portion of this vapor phase is removed from the head 15 of the column, is compressed at 17 and is introduced into the equalizing reservoir 18 which can supply the krypton phase to the bottles 19.

As noted, the xenon component is recovered from the sump 16 of the rectification column and is fed via a distributing bath 23 through the heat exchanger 22 in which the liquid xenon expands and is displaced by a pump 21 into the digester 1 as the sparging gas. Line 20 carries the sparging gas into the digester 1.

The recycled portion of the inert gases thus serves simultaneously as the sparging gas and as the cooling medium for the exhaust gas before its compression at 12.

In the sump 16 of the rectification column 14, practically pure xenon is recovered and excess xenon can be withdrawn from the distributing valve 23, partly bypassing the recycling path, to be fed into bottles similar to those shown at 19. The xenon thus discharged from the system can be used for other purposes.

For many applications the xenon which is recovered by the present system can be used directly and without further cleaning, having sufficient purity. Additional cleaning of the xenon is not usually necessary.

The surplus xenon can, moreover, be stored in a reservoir similar to that shown at 10 in FIG. 1 for subsequent feeding, as required, via the valve 23 to the digesting vessel 1 as the sparging gas.

During the start of the system, it is preferred to introduce via the distributing valve, an inert sparging gas which may have been stored from a previous cycle or which can also be argon and/or helium.

An example of the operation of the system of the present invention, the digester may be operated continuously to solubilizer 52 kg/hour of nuclear fuel elements. The digester is supplied with the comminuted and burned nuclear fuel elements by a metering conveyor not shown in detail. The resulting volatile components are withdrawn as the exhaust gas from the digesting unit 1 and between 5 and 10 meters$^3$ STP/hour of fission-product inert gas is recycled as the sparging gas.

From the nuclear fuel material about 0.16 to 0.53 meters$^3$ STP/hour of additional fission-product inert gas is recovered. Preferably, the feeder or other dosing device for metering the nuclear fuel material into the digesting vessel 1 is bathed with the sparging gas recycled to the system.

The reservoir 7, into which the fission-product inert gas is led after passing through the filter 6, is preferably so formed that the average residence time of the gas in the reservoir is large by comparison to its residence time in the gas cycle. This ensures that small pressure and volume rate of flow fluctuations can be easily compensated without compelling the fission-product inert gas system to be operated at any point at an excessively high pressure.

Large pressure and volume rate of flow are also compensated by the used of the intervening reservoir 10. The intervening reservoir 10 can be operated at a pressure up to 200 bar.

A controller 35 in line 2 measures the volume rate of flow of the sparging gas through this duct into the digesting unit 1 and controls a valve 36 to ensure an appropriate and constant feed rate of the recycled fission-product inert gas. This controller maintains the rate of flow through conduit 2 between 5 and 10 meters$^3$ STP/hour. The surplus fission-product inert gas is recovered at a rate of 0.3 to 0.4 meters$^3$ STP/hour and is supplied by an intermediate reservoir 10 to the bottles 11.

In another example of the present invention, the digestion unit 1 is operated discontinuously in accordance with the conventional Purex process. In order to ensure proper sealing of the circulation path, the digestion unit 1 can be provided with a gate system (not shown in the drawing) so that leakages are held below 0.2 meters$^3$ STP/hour.

In the sparging gas recycling system, the waste gases released in the Purex process are recovered in a sparging gas which is supplied at a rate of about 300 meters$^3$ STP/hour. During the solubilization of the nuclear fuel material in the digestion column, the fission-product inert gas is discharged by a bypass 23 and stored. It can be reintroduced into the sparging cycle as required.

I claim:

1. A process for treating nuclear fuel material in the form of elements containing graphitic components, comprising the steps of:

comminuting said nuclear fuel elements;

combusting said nuclear fuel elements to burn off graphitic components thereof and form a residue;

chemically solubilizing the residue following the comminution and combustion of said nuclear fuel elements in a digester by contacting said residue with an acid in which said residue is soluble;

passing recycled fission product inert gas as a sparging gas through the solution in said digester to entrain with said sparging gas fission-product inert gases released from said nuclear fuel elements and forming with the released fission-product inert gases a waste gas; and recycling a portion of the fission-product inert gas to said digester as said sparging gas.

2. The process defined in claim 1 wherein the waste gas derived from said digester is thereafter filtered, said process further comprising the steps of compressing said waste gas subsequent to the filtering thereof, and stirring the compressed waste gas, a portion of the stored waste gas serving at least in part as said sparging gas.

3. The process defined in claim 2, further comprising the step of removing from the filtered gases by rectification a krypton component before said fission-product inert gas is recycled to said digester and said sparging gas.

4. The process defined in claim 3 wherein said krypton component is separated from said filtered waste gas in a rectification column as a vapor phase, a phase consisting predominantly of xenon being removed from a sump of said rectification column and being recycled to said digester as said sparging gas.

5. A process for treating nuclear fuel material in nuclear fuel elements comprising the steps of:

comminuting said nuclear fuel elements, chemically solubilizing the nuclear fuel material following the comminution in a digester by contacting said material with an acid in which said material is soluble, passing recycled fission-product inert gas as a sparging gas through the solution in said digester to entrain with said sparging gas fission-product inert gases released from said nuclear fuel material and forming with the released fission-product inert gases a waste gas, and recycling a portion of the fission-product inert gas to said digester as said sparging gas.

* * * * *